(12) United States Patent
Aoki

(10) Patent No.: US 6,807,365 B1
(45) Date of Patent: Oct. 19, 2004

(54) VIDEO DATA RECORDING AND REPRODUCING APPARATUS, A VIDEO DATA REPRODUCING APPARATUS, AND A METHOD OF RECORDING AND REPRODUCING VIDEO DATA WITH DATA MODIFICATION DETECTION

(75) Inventor: Yoshito Aoki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/577,129

(22) Filed: May 24, 2000

(30) Foreign Application Priority Data

May 26, 1999 (JP) ............................................. 11-146959

(51) Int. Cl.[7] .......................... H04N 5/917; H04N 7/26
(52) U.S. Cl. .......................... 386/109; 386/46; 386/117
(58) Field of Search .............................. 386/46, 94, 95, 386/27, 33, 98, 107, 109, 113, 117, 112, 124–126; 360/72.1, 72.2

(56) References Cited

U.S. PATENT DOCUMENTS

| | | | |
|---|---|---|---|
| 5,371,602 A | * 12/1994 | Tsuboi et al. | .................. 386/95 |
| 5,646,994 A | 7/1997 | Hill | |
| 6,470,141 B2 | * 10/2002 | Kawamura et al. | ......... 386/109 |
| 6,507,695 B2 | * 1/2003 | Henmi et al. | ............... 386/111 |
| 6,594,439 B2 | * 7/2003 | Imahashi et al. | ............. 386/98 |

FOREIGN PATENT DOCUMENTS

| | | |
|---|---|---|
| EP | 0854633 | 7/1998 |
| EP | 1001601 | 5/2000 |
| JP | 10-283268 | 10/1998 |
| JP | 11-69136 | 3/1999 |

* cited by examiner

Primary Examiner—Thai Tran
Assistant Examiner—Christopher Onuaku
(74) Attorney, Agent, or Firm—Louis Woo

(57) ABSTRACT

First modification detection data is generated from the (compressed) video data. The video data is combined with the first modification detection data. The combined data is recorded on a recording medium. The read combined data is separated into the compressed video data and the first modification detection data. Second modification detection data is generated according to the separated compressed data. The separated first data modification detection data is compared with the second data modification detection data to detect data modification. Outputting expanded video data is controlled according to the comparing result. The recorded data may be copied on a removable disc. A data reproducing apparatus having the second modification detection data generation circuit and the comparing circuit reproduces the removable disc. The reproduced video data may be further processed by a watermark processing circuit to embed watermark data in the video data which are recorded on another removable disc. The compressed video data may be transmitted through a network with encrypting. Encrypting key data is exchanged between the data transmitting side and the receiving side for decrypting. Encrypted video data may be recorded or transmitted and the encrypting key is stored for decrypting or transmitted for decrypting.

12 Claims, 12 Drawing Sheets

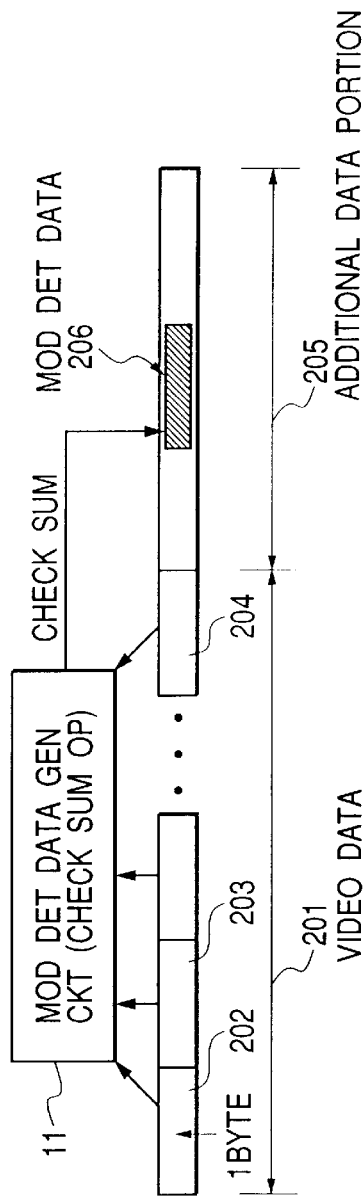
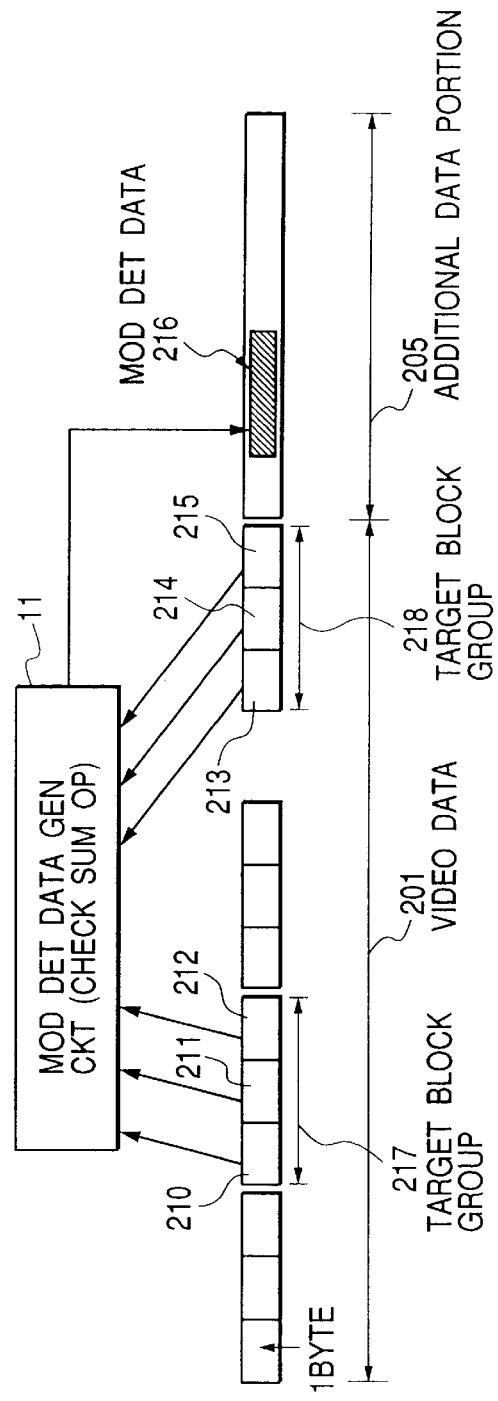

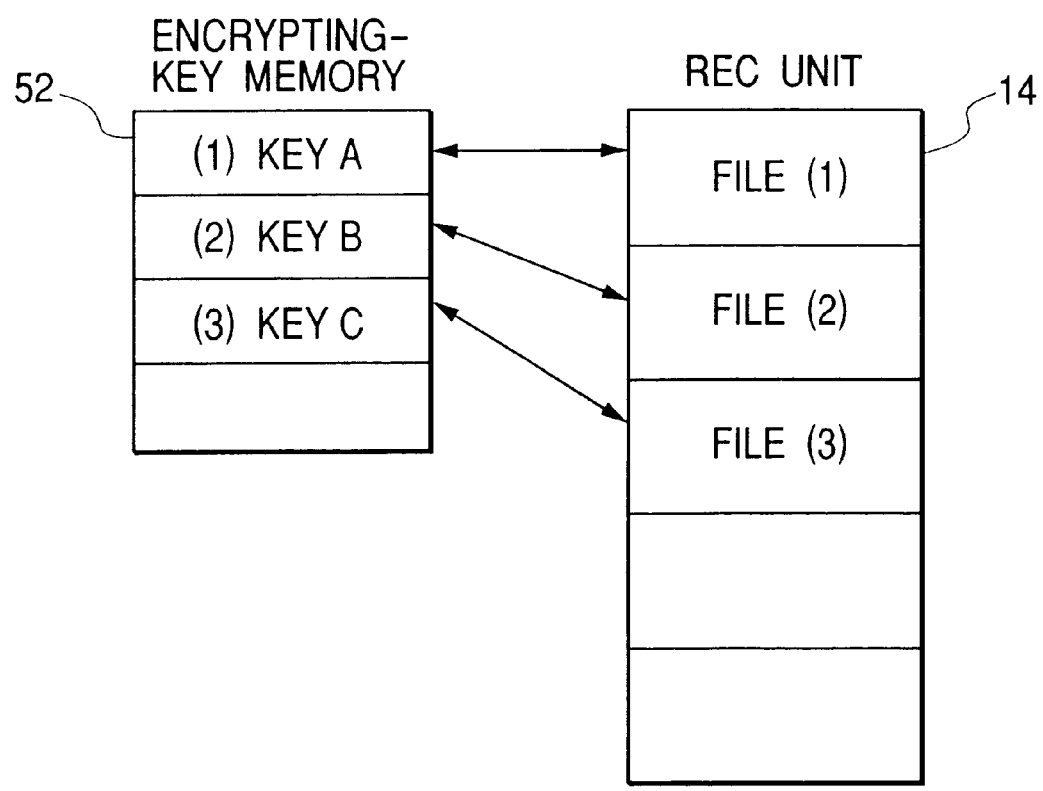

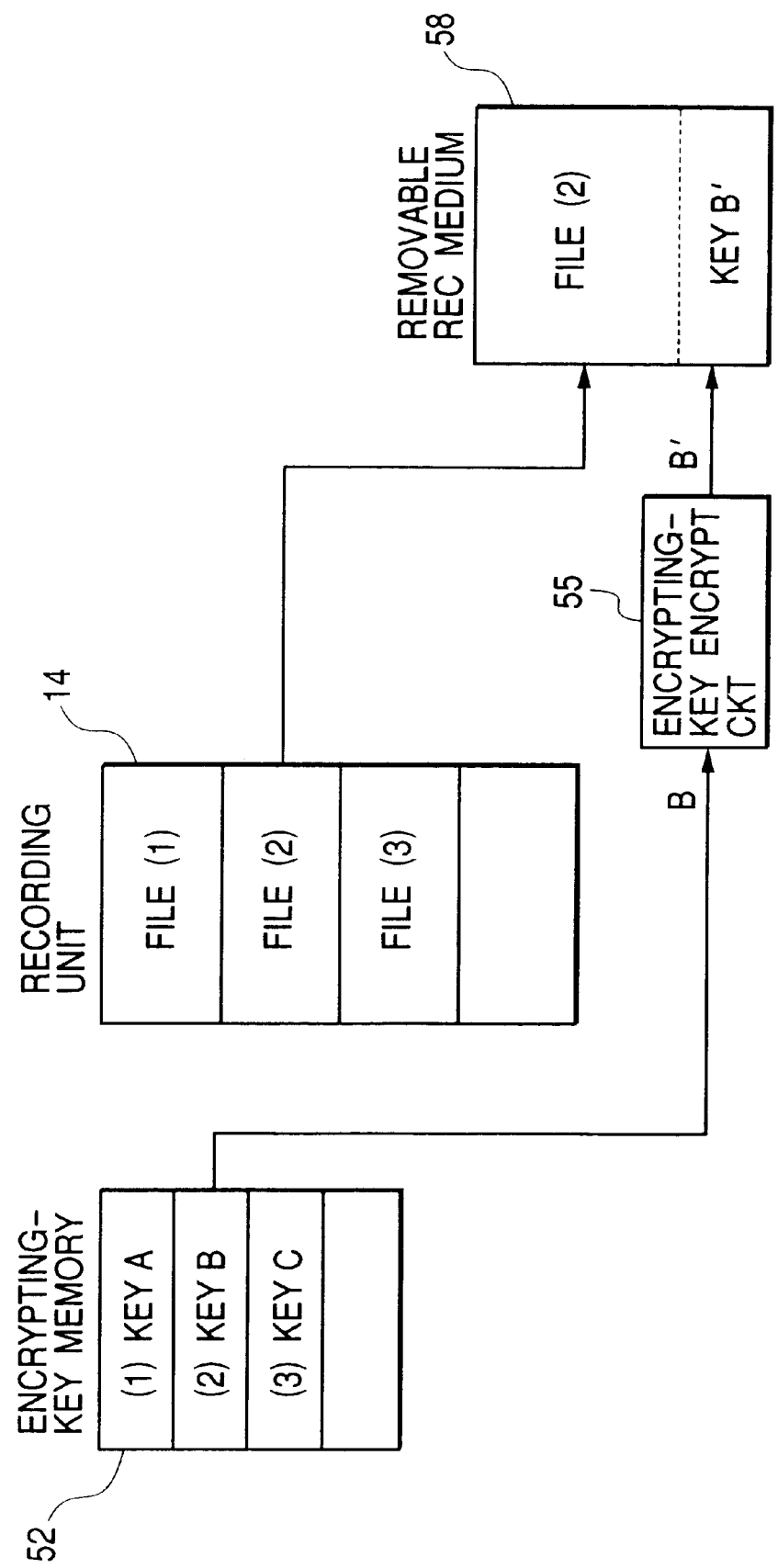

US 6,807,365 B1

VIDEO DATA RECORDING AND REPRODUCING APPARATUS, A VIDEO DATA REPRODUCING APPARATUS, AND A METHOD OF RECORDING AND REPRODUCING VIDEO DATA WITH DATA MODIFICATION DETECTION

BACKGROUND OF THE INVENTION

1. Field of the Invention

This invention relates to a video data recording and reproducing apparatus, a video data reproducing apparatus with data modification detection, and a method of recording and reproducing video data with data modification detection.

2. Description of the Prior Art

A video data recording and reproducing apparatus for recording video data and reproducing the video data, a video data reproducing apparatus for reproducing video signal, and a method of recording and reproducing video data are known.

FIG. 13 is a block diagram of a prior art video data recording and reproducing apparatus. A video signal from a camera 101 is a/d-converted into video data by an a/d converter 104. The video data is compressed by a video data compression circuit 105 and recorded on a recording unit 106. A video data expansion circuit 107 expands the video data from the recording unit 106. A d/a converter 108 d/a-converts the video data from the video data expansion circuit 107 into a reproduction video signal. The reproduction video signal is displayed on a display monitor 103. When there is a request for modifying the video data or editing the video data, a password processing circuit 109 identifies the inputted password. If the inputted password is correct, it is allowed to modify or edit the video data.

SUMMARY OF THE INVENTION

The aim of the present invention is to provide a superior video data recording and reproducing apparatus, a superior video data reproducing apparatus, and a superior method of recording and reproducing video data.

According to the present invention there is provided a first video data recording and reproducing apparatus. In the first video data recording and reproducing apparatus, a data compression circuit compresses video data. A first modification detection data generation circuit generates first modification detection data in accordance with the compressed video data. A combining circuit combines the video data with the first modification detection data to output combined data. A recording circuit records the combined data on a recording medium. A reading circuit reads the combined data from the recording medium. A separating circuit separates the combined data from the reading circuit into the compressed video data and the first modification detection data. A second modification detection data generation circuit generates second modification detection data in accordance with the compressed data from the separating circuit. A comparing circuit compares the data modification detection data from the separating circuit with the second data modification detection data. A data expansion circuit expands the compressed video data from the separating circuit to output expanded video data. An outputting control circuit controls outputting the expanded video data in accordance with the result of the comparing circuit.

In the first video data recording and reproducing apparatus, the first modification detection circuit may include an error check code generating circuit for generating the first modification detection data from at least a portion of the video data and the first modification detection circuit may generate the first modification detection data from at least a portion of the video data. The first modification detection data is represented with one selected from the group consisting of check sum codes, parity codes, and Cyclic Redundancy Check codes.

The first video data recording and reproducing apparatus may further include a recording circuit for recording the combined data from the reading circuit on a removable recording medium.

According to the present invention there is also provided a first video data reproducing apparatus for reproducing combined data including compressed video data and first modification detection data on a removable recording medium, the video data being recorded with first modification detection data generated in accordance with the video data with correspondence with the video data. In the first video data reproducing apparatus, a reading circuit reads the combined data from the removable recording medium. A separating circuit separates the combined data from the reading circuit into the compressed video data and the first modification detection data. A modification detection data generation circuit generates second modification detection data in accordance with the compressed data from the separating circuit. A comparing circuit compares the first modification detection data from the separating circuit with the second data modification detection data. A data expansion circuit expands the compressed video data from the separating circuit to output expanded video data. An outputting control circuit controls outputting the expanded video data in accordance with the result of the comparing circuit.

In the first video data reproducing apparatus, the reading circuit may include a DVD-RAM drive unit and the removal recording medium comprises a DVD-RAM disc.

In the first video data reproducing apparatus, the modification detection data generation circuit may include a first software processing circuit for executing a first program to generate the second modification detection data. The comparing circuit may include a second software for comparing the data modification detection data from the separating circuit with the second data modification detection data. The data expansion circuit may include a third software for expanding the compressed video data from the separating circuit.

In the first video data reproducing apparatus may further include: a time data generation circuit for generating present time data; a condition detection circuit including a memory and an input circuit for detecting a condition in accordance with condition data from the memory and input data from the input circuit; an electronic watermark data adding circuit for generating watermark data from the present time data and the condition and adding the watermark data to the expanded video data to generate watermark data added video data; and a recording circuit for recording the watermark data added video data on another removable recording medium.

The first video data recording and reproducing apparatus may further include: a network interface circuit for communicating with a network; a decrypting control data generation circuit for generating decrypting control data in accordance with an encrypting key; an encrypting circuit for encrypting the combined data with the encrypting key. The network interface circuit may transmit the encrypted combined data and the decrypting control data to the network.

According to the present invention there Is further provided a second video data reproducing apparatus for reproducing data encrypted with a first key from a network. In the second video data reproducing apparatus, a network interface circuit receives video data and decrypting key data generated from the first key from the network. A decrypting key data generation circuit generates a second key in accordance with the decrypting key data. A decrypting circuit decrypts the data with the second key. A recording circuit in the second video data reproducing apparatus records the decrypted data on another removable recording medium.

According to the present invention there is further provided a second video data recording and reproducing apparatus. In the second video data recording and reproducing apparatus. A data compression circuit compresses video data. An encrypting circuit encrypts the video data from the data compression circuit with a first key. A recording circuit records the video data from the encrypting circuit on a recording medium. A reading circuit reads the video data from the recording medium. A storing circuit stores the first key. An inputting circuit inputs a second key. A decrypting circuit decrypts the video data from the reading circuit with the second key. A data expansion circuit expands the video data from the decrypting circuit to output expanded video data. When the first key corresponds to the second key, the video data is correctly decrypted.

In the second video data recording and reproducing apparatus, the first key may be a common encrypting key.

The second video data recording and reproducing apparatus may further include an encrypting key encrypting circuit for encrypting the first key with one selected from a group including a common encrypting key or a public encrypting key.

The second video data recording and reproducing apparatus may further include: a key encrypting circuit for encrypting the first key in accordance with key data; a combining circuit for combining the video data from the encrypting circuit with the first key from the key encrypting circuit to output combined data; a recording circuit for recording the combined data on a removable recording medium.

According to the present invention there is further provided a third video data reproducing apparatus for reproducing data including encrypted compression video data and a key used for encrypting the data. The key is encrypted with first key data. In the third video data reproducing apparatus, a reading circuit reads the data on a removable recording medium. A separating circuit separates the data from the reading circuit into the encrypted compression video data and the key. An inputting circuit inputs second key data. A key decrypting circuit decrypts the key with the second key data. A data decrypting circuit decrypts the compression video data from the separating circuit with the key from the key decrypting circuit. An expansion circuit expands the compression video data from the data decrypting circuit to output expanded video data.

The second video data recording and reproducing apparatus may further include: a network interface circuit for communicating with a network; an enciphering key control circuit for receiving key data regarding the first key from the network and enciphering the first key in accordance with the key data. The network interface circuit transmits the video data from the reading circuit and the enciphered first key to the network.

According to the present invention there is further provided a fourth video data reproducing apparatus for reproducing encrypted compression video data. In the fourth video data reproducing apparatus, a network interface circuit receives the encrypted compression video data and a key used for encrypting compression video data. The key is encrypted with first key data. An inputting circuit inputs second key data. A key decrypting circuit decrypts the key with the second key data. A data decrypting circuit decrypts the compression video data from the network interface circuit with the key from the key decrypting circuit. An expansion circuit expands the compression video data from the data decrypting circuit to output expanded video data.

According to the present invention, there is a first method of recording and reproducing video data with data modification detection including the steps of: generating first modification detection data in accordance with the compressed video data; correspondingly recording the compressed video data and the modification detection data on a recording medium; reading the compressed video data and the first modification detection data from the recording medium; generating second data modification detection data in accordance with the read compressed data; comparing the read first data modification detection data with the second data modification detection data; and controlling reproducing the compressed data in accordance with the comparing result.

According to the present invention, there is a second method of recording and reproducing video data with data modification detection including the steps of: generating an encrypting key every file of the video data; encrypting a file of the video data with the enciphering key; recording the file on a recording medium; reading the file on the recording medium; inputting circuit for inputting a second key; decrypting the video data with the second key. Thus, the decrypted video data can be used when the first key corresponds to the second key.

According to the present invention there is further provided a third video data recording and reproducing apparatus. In the third video data recording and reproducing apparatus, a first modification detection data generation circuit generates first modification detection data from video data. A recording circuit correspondingly records the video data and the first modification detection data on a recording medium. A reading circuit reads the video data and the first modification detection data from the recording medium. A second modification detection data generation circuit generates second modification detection data in accordance with the video data from the reading circuit. A comparing circuit compares the first data modification detection data from the reading circuit with the second data modification detection data. An outputting control circuit controls outputting the video data from the reading circuit in accordance with the result of the comparing circuit.

The third video data recording and reproducing apparatus may further include: a data compression circuit for compressing video data to supply compressed video data to the first modification detection data generation circuit and the recording circuit as the video data; and a data expansion circuit for expanding the video data from the reading circuit to supply expanded video data to the outputting control circuit as the video data.

According to this invention, there is provided a fifth video data reproducing apparatus. In the fifth video data reproducing apparatus, a receiving circuit receives video data and first modification detection data generated in accordance with the video data. A modification detection data generation circuit generates second modification detection data in accordance with the video data from the receiving circuit. A comparing circuit compares the first modification detection data from the receiving circuit with the second data modification detection data. An outputting control circuit controls outputting the video data in accordance with the result of the comparing circuit.

BRIEF DESCRIPTION OF THE DRAWINGS

The object and features of the present invention will become more readily apparent from the following detailed description taken in connection with the accompanying drawings in which:

FIG. 2 is an illustration of operation of the first embodiment;

FIG. 3 is an illustration of a modified operation of the first embodiment;

FIG. 9A is an illustration of the fifth embodiment showing data in the encrypting key memory;

FIG. 9B is an illustration of the fifth embodiment showing data recorded in the recording unit;

FIG. 11 is an illustration of the sixth embodiment showing the data storing condition;

The same or corresponding elements or parts are designated with like references throughout the drawings.

DETAILED DESCRIPTION OF THE INVENTION

First Embodiment

Figure 1:
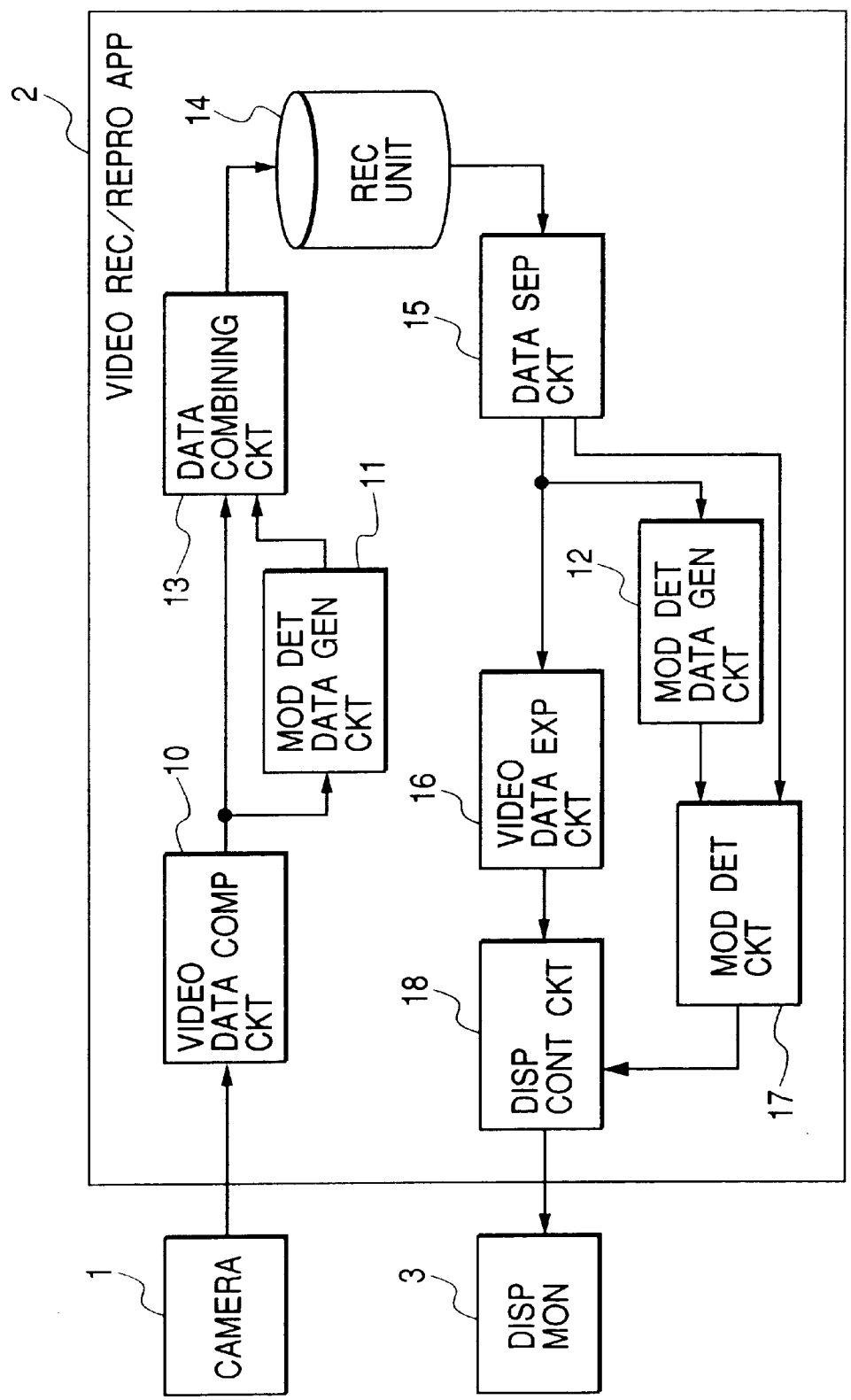
FIG. 1 is a block diagram of a video recording and reproducing apparatus according to a first embodiment.

FIG. 1 is a block diagram of a video recording and reproducing apparatus according to a first embodiment.

A video signal from a camera 1 is supplied to a video recording and reproducing apparatus 2.

A recording side of the video recording and reproducing apparatus 2 includes a video data compression circuit 10 for a/d-converting the video signal into video data and compressing the video data, a modification detection data generation circuit 11 for generating first modification detection data, a data combining circuit 13 for combining the compressed video data with the first modification detection data from the modification detection data generation circuit 11, and a recording circuit 14 for recording the combined data on a recording medium.

A reproducing side of the video recording and reproducing apparatus 2 includes the recording circuit 14 for reading the combined data on the recording medium, a data separating circuit 15 for separating the combined data from the recording circuit 14 into the compressed video signal and the first modification detection data, a video data expansion circuit 16 for expanding the compressed video data form the data separating circuit 15, a modification detection data generation circuit 12 for generating second modification detection data from the compressed video data from the data separating circuit 15, a modification detection circuit 17 for detecting modification in the compressed video data by comparing the first modification detection data with the second modification detection data, and a display control circuit 18 for controlling outputting the expanded video data from the video data expansion circuit 16 in accordance with the result of comparing in the modification detection circuit 17.

The output of the display control circuit 18, that is, the expanded video signal, is supplied to a display monitor 3 which reproduces the expanded video data to provide reproduced video images to a user.

The video data compression circuit 10 a/d-converts the video signal from the camera 1 into video data and compresses the video data to reduce the amount of data. Generally, JPEG, wavelet Transform, intra-frame compression methods such as DV method, or interframe compression method such as MPEG1, MPEG4, H.261, H.263 is used for compressing the video data.

The modification detection data generation circuit 11 generates the first modification detection data in accordance with the compressed video data by error detection conversion such as the checksum, CRC (Cyclic Redundancy Check), and the parity check. In the checksum, bits in one unit (generally, an integer times the number of bytes) of video data are summed. A total is used for the first modification data. Moreover, a portion of the total may be used for the first modification detection data. In CRC, CRC is calculated from compressed video data at a specified region. In the parity check, the first modification detection data is generated in accordance with whether the number of bits "1" in an array of compressed video data is odd or even.

The data combining circuit 13 combines the compressed video data with the first modification detection data from the modification detection data generation circuit 11. More specifically, the compressed video data has a format such that a pair of a unit of the compressed video data and an additional data portion is repeatedly outputted from the video data compression circuit 10. The data combining circuit 13 embeds the first modification detection data in the additional data portion.

Generally, in the hard disc drive unit or an optical disc unit, a data amount in a sector is predetermined. Thus, if data of which data amount is less than that of the sector is recorded, actually recorded data amount is increased such that the data amount of the recorded data is an integer times the data amount of the sector.

Moreover, there are various types of video data having formats where an additional data portion is attached to a unit of video data. That is, a pair of a unit of video data and its additional data portion are repeatedly generated and recorded. Therefore, a spare portion in the additional data portion can be used for embedding the first modification detection data. In this case, the format of the video data is unchanged, so that compatibility with a conventional video data apparatus can be provided.

FIG. 2 shows this operation. The video data 201 includes a plurality of bytes 202 to 204. The modification detection data generation circuit 11 generates checksum from each of bytes 201 to 204 and embeds the first modification detection data at an additional data portion 205. In this example, the additional data portion 205 is provided just after the video data 201. However, the additional data portion 205 may be provided just before the video data 201.

In the case of intra-frame-compressed video data, it is desirable that the first modification detection data is embedded at the additional data portion at a frame of data. However, it is also possible to embed the first modification detection data only in I pictures of the video data. That is, in the intra-frame-compression, it is easy to extract video data at one still picture unit. On the other hand, in the inter-frame compression, the I picture at the top of blocks is the same as a still picture. On the other hand, video data at frames after the I picture represent difference in video data between the preceding frame and the post frames. It is more difficult to directly modify the difference data than the case of modification in the intra-frame compression.

In the reproducing side, the data to be reproduced is read from the recording unit 14 at a unit of frame. That is, the recording circuit 14 reads the combined data on the recording medium. At each frame, because a pair of the video data and modification detection data are recorded, the data separating circuit 15 separates the combined data from the recording circuit 14 into the compressed video data and the first modification detection data. The compressed video data is supplied to the video data expansion circuit 16 and to a second modification detection data generation circuit 12. The video data expansion circuit 16 expands the compressed video data. The modification detection data generation circuit 12 generates second modification detection data from the compressed video data from the data separating circuit 15 in the same manner as the first modification detection data generation circuit 11. In other words, it is also possible to omit the second modification detection data generation circuit 12 by commonly using the first modification detection data generation circuit 11. The modification detection circuit 17 detects modification or editing in the compressed video data by comparing the first modification detection data with the second modification detection data. The display control circuit 18 compares the first modification data with the second modification data and controls outputting the expanded video data from the video data expansion circuit 16 in accordance with the result of comparing in the modification detection circuit 17. That is, when the first modification data agrees with the second modification data, the display control circuit 18 permits to supply the video data to the display monitor 3 and inhibits to supply the video data to the display monitor 3.

The display monitor reproduces the expanded video data to provide reproduced video image to a user when outputting the video data is permitted.

As mentioned, according to the first embodiment, in the recording process, the modification detection data generation circuit 11 generates the first modification detection data in accordance with compressed video data, the data combining circuit 13 combines the video data with the first modification detection data.

In the reproducing process, the data separating circuit 15 separates the read combined data into the compressed video data and the first modification detection data. The second modification detection data generation circuit 12 generates the second modification detection data in accordance with the compressed data from the data separating circuit 15. The modification detection circuit 17 compares the first data modification detection data from the data separating circuit 15 with the second data modification detection data to detect modification in the compressed video data. Therefore, modification or editing in the video data can be provided without format modification.

FIG. 3 is an illustration of a modified operation of the first embodiment. In the above-mentioned embodiment, the modification data is generated from all compressed video data in a frame. However, it is also possible to generate the modification detection data from a portion of the compressed video data 201 in a frame. That is, the first (second) modification detection data generation circuit 11 (12) generates the first (second) modification detection data from video data in specified blocks 210 to 212 (target block group 217) and specified blocks 213 to 215 (target block group 218). The data combining circuit 13 combines the modification detection data with the video data in the frame as shown in FIG. 3. That is, the data combining circuit 13 embeds the modification detection data in a predetermined portion in the additional data portion 205.

This data modification detection process reduces the amount of calculation to suppress the scale of the circuits and calculation time interval.

In this embodiment, the data combining circuit 13 combines the bytes 202 to 204 of the video data with the additional data portion 205. However, it is also possible to correspondingly record the bytes 202 to 204 of the video data and the modulation detection data 206 on the recording medium of the recording unit 14. That is, it is not necessary that the data stream of the video data is connected to the additional data portion 205 but the data stream of the video data and the additional data portion 205 are correspondingly recorded or recorded with a relation therebetween. Moreover, the video data compression circuit 10 and the video data video data expansion circuit 10 may be omitted.

Second Embodiment

Figure 4:
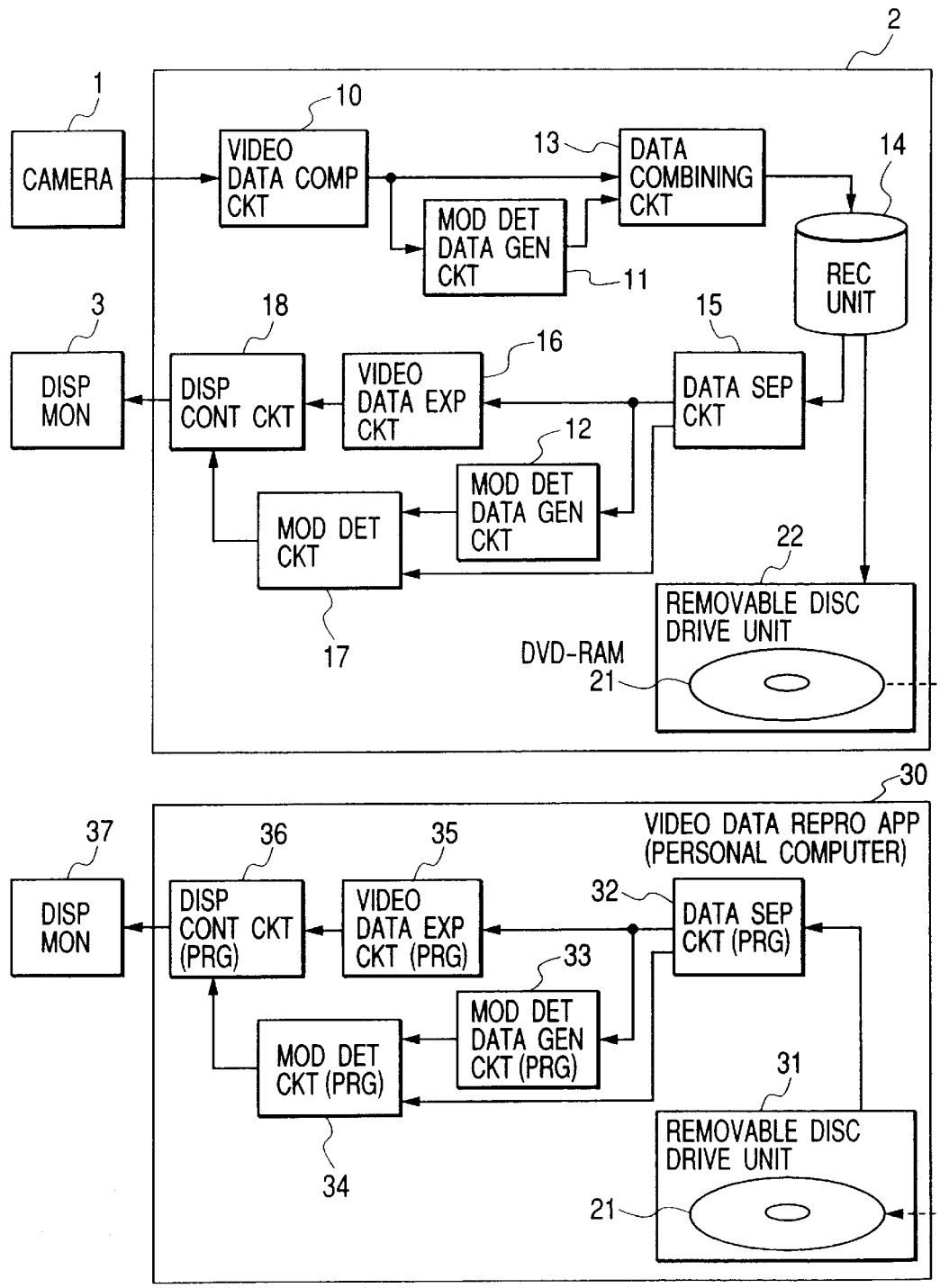
FIG. 4 is a block diagram of a video recording and reproducing apparatus according to a second embodiment.

FIG. 4 is a block diagram of a video recording and reproducing apparatus according to a second embodiment. The structure of the second embodiment is substantially the same as the first embodiment. The difference is in that a removable disc recording unit 22 is further provided. Moreover, a video reproducing apparatus 30 is disclosed. The video reproducing apparatus 30 includes the a removable disc unit 31 and circuitry of the reproducing side of the first embodiment is also disclosed. The combined data recorded in the recording circuit 14 is read and stored in the removable recording medium 21. The removable recording medium 21 removed from the removable disc drive unit 22 and put in the removable disc drive unit 31 which reproduces the combined data. If the data modification is not detected, the reproduced video data is displayed on a display monitor 37.

In this embodiment, a DVD-RAM disc is used as the removable recording medium 21. However, other removable recording mediums such as other types of optical discs, magnet-optical disc, and magnetic tapes can be used.

The combined data is stored in the recording circuit 14 in the same manner as the first embodiment. The combined data is read and copied on the removable recording medium 21 by the removable disc drive unit 22. That is, every pair (frame) of the video data and the modification data are read from the recording circuit 14 and copied on the removable recording medium 21 by the removable disc drive unit 22.

Figure 5:
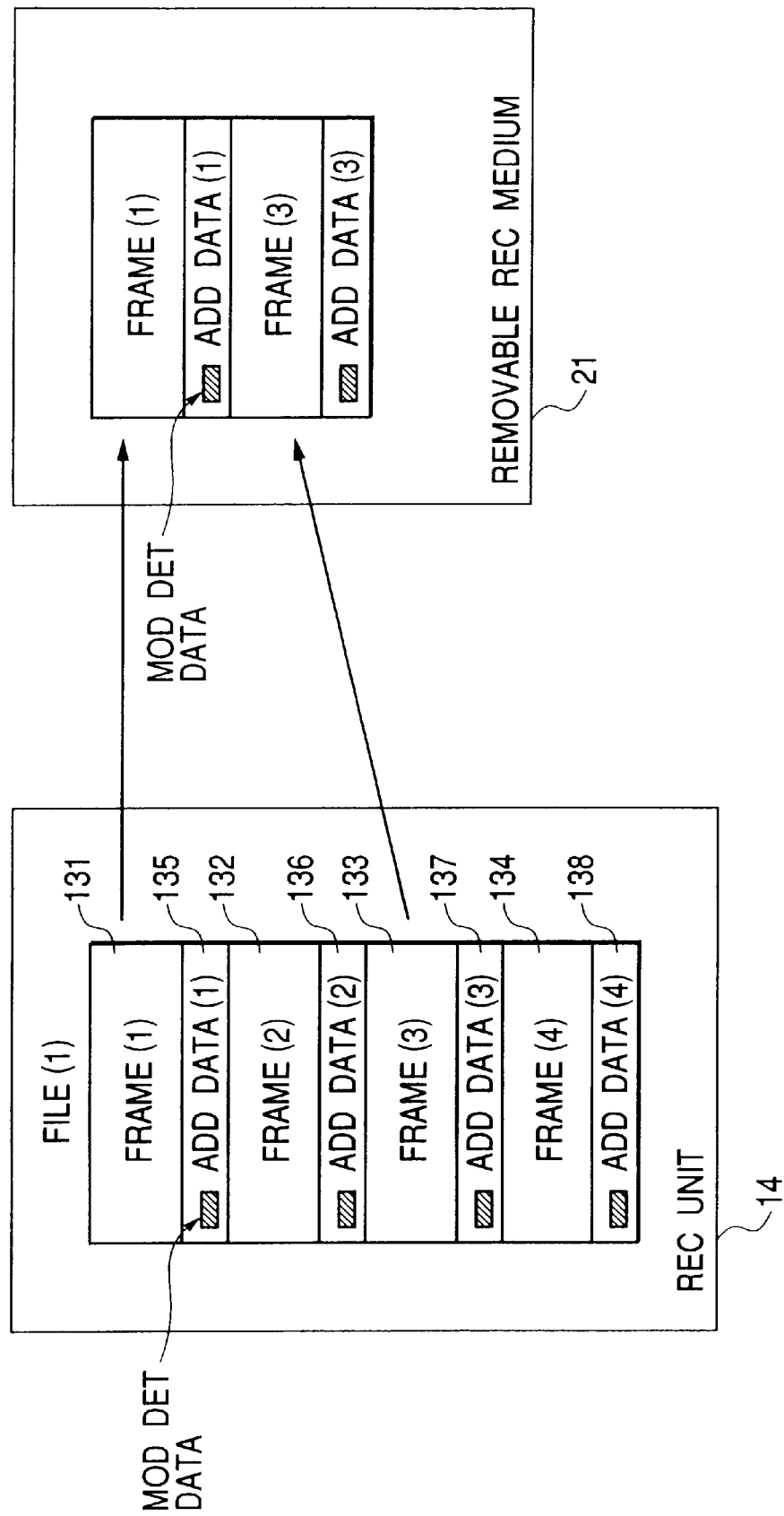
FIGS. 5A and 5B are illustrations of the second embodiment showing a copying operation.

FIGS. 5A and 5B are illustrations of the second embodiment showing the copying operation.

In this example, it is assumed that there are four frames 131 to 134 of video and corresponding additional data portions 135 to 138 in a file (1). Moreover, it is assumed that two frames of video data 131 and 133 are copied on the removable recording medium 21. Each pair of a frame of data and additional data are recorded on the removal recording medium 21. That is, the frame of video data 131 and the additional data 135 are recorded correspondingly and the frame of video data 133 and the additional data 137 are recorded correspondingly.

Next, reproducing operation of the removal recording medium by a modified video reproducing apparatus 30 will be described.

The video reproducing apparatus 30 may comprise a personal computer having the removable disc drive unit 21 and executing the operations of the data separating circuit 32, the modification detection data generation circuit 33, the modification detection circuit 34, the video data expansion circuit 35, and the display control circuit 36.

The removable disc drive unit 31 reads the pair of video data and modification detection data on the removable recording medium 21. The data separating circuit (program) 32 separates the data from the removable disc drive unit 31 into the compressed video data and the first modification detection data. The compressed video data is supplied to the video data expansion circuit (program) 35 and to a second modification detection data generation circuit (program) 33. The video data expansion circuit (program) 35 expands the compressed video data. The modification detection data generation circuit (program) 33 generates second modification detection data from the compressed video data from the data separating circuit 32 in the same manner as the first modification detection data generation circuit 11. The modification detection circuit 33 detects modification in the compressed video data by comparing the first modification detection data with the second modification detection data. That is, the modification detection circuit 34 (program) compares the first modification data with the second modification data. The display control circuit (program) 36 controls outputting the expanded video data from the video data expansion circuit 35 in accordance with the result of comparing in the modification detection circuit 17. That is, when the first modification data agrees with the second modification data, the display control circuit 36 permits to supply the video data to the display monitor 37 and inhibits to supply the video data to the display monitor 37.

The display monitor reproduces the expanded video data to provided reproduced video image to a user when outputting the video data is permitted.

In the case that the video reproducing apparatus 30 is provided with a personal computer, the operations in the video reproducing apparatus 30 are provided by using the programs in the personal computer.

As mentioned above, each pair of video data and modification detection data are copied on the removal recording medium. In the video reproducing apparatus, each pair of video data and modification detection data are read and separated. The modification (editing) of data is detected by comparing the first modification detection data and the second modification data generated in the reproducing apparatus 30. The outputting the video data is controlled in accordance with the comparing result, so that illegal copying can be detected and prevented.

Third Embodiment

Figure 6:
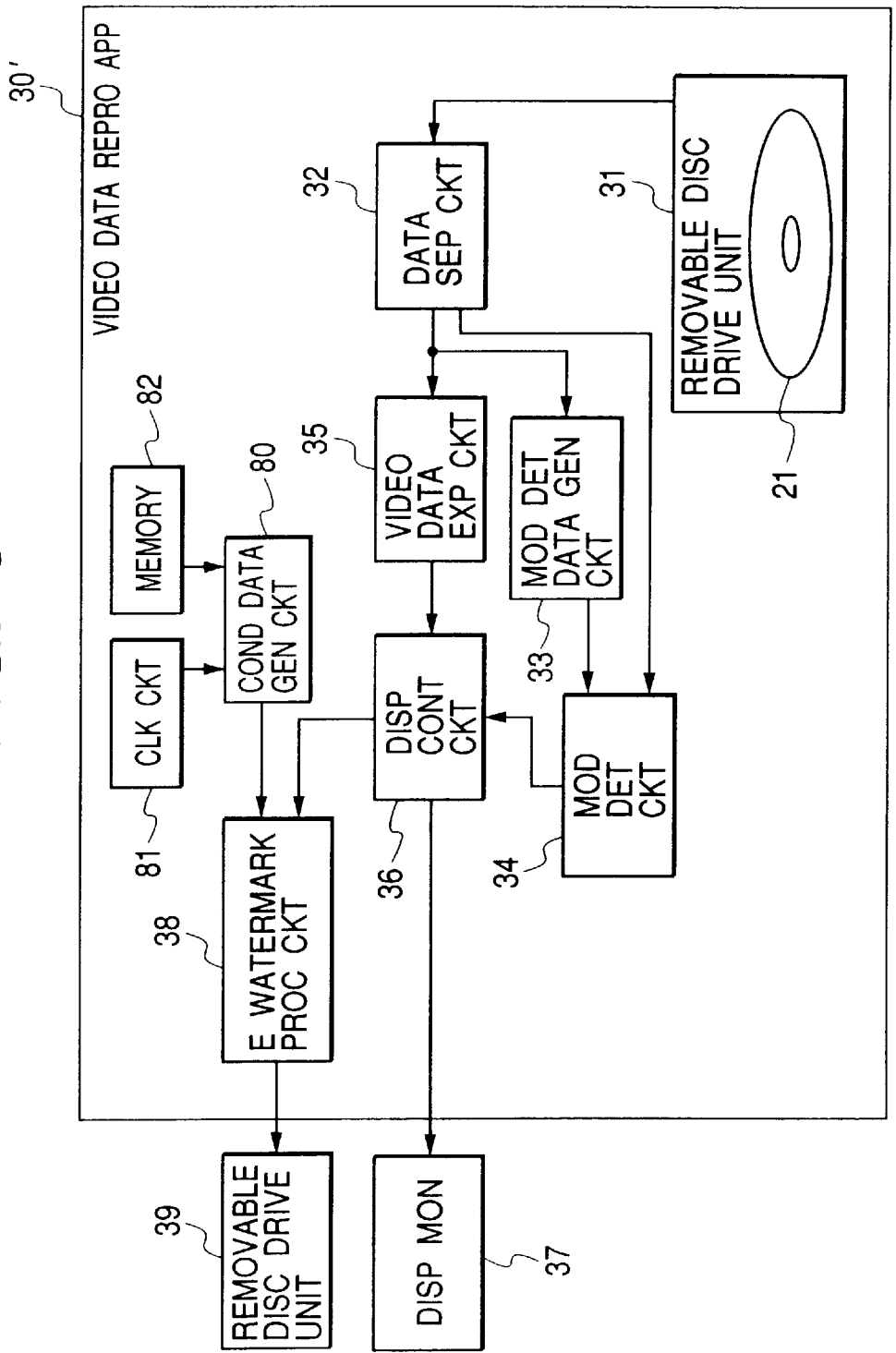
FIG. 6 is a block diagram of a video reproducing apparatus according to a third embodiment.

FIG. 6 is a block diagram of a video reproducing apparatus according to a third embodiment. The structure of the video reproducing apparatus 30' according to the third embodiment is substantially the same as that according to the second embodiment. The difference is that an electronic watermark processing circuit 38, a condition data generation circuit 80, a clock circuit 81, and a memory 82 are further provided.

In this embodiment, if the video reproducing apparatus 30' is provided with a personal computer, it is convenient to output the video data in a data format generally provided to a personal computer for recording. In this case, illegal use such as the modification of the video data should be prevented. To prevent illegal use, an electronic watermark is embedded in the video data.

The video data is reproduced in the same manner as the second embodiment if there is no data modification. In addition, if the video data is outputted as still image data, the electronic watermark processing circuit 38 embeds watermark data in the video data and a removable disc drive unit 39 records the video data with the watermark data on a removable recording medium. The condition data generation circuit 80 generates watermark data from present date and time data from a clock circuit 81, identification data such as image shooting apparatus and an image shooting person from the memory 82.

In the case of personal computers, it is convenient to a data size of a frame of video data is small. Thus, adding the data modification data to the video data is not convenient for personal computers having no data modification detection function. On the other hand, embedding watermark in the video data does not increase the size of the video data. Thus, it is superior to embed watermark data in the video data in a personal computer having no data modification detection function.

If the video data is modified, a portion of the watermark is destroyed, so that it is possible to detect the presence of modification with a program for detecting the destroying. Moreover, the information of the original video data is also recorded with the video data over a plurality of generations, so that recording condition such as the image shooting date and time can be recorded in a copy of any generation.

According to the third embodiment, video data can be copied on another removal recording medium from the reproducing apparatus 30', wherein watermark data is embedded in the video data, so that modification after copying can be detected and prevented. Moreover, identification of the video data can be provided at any generation of copy.

Fourth Embodiment

Figure 7:
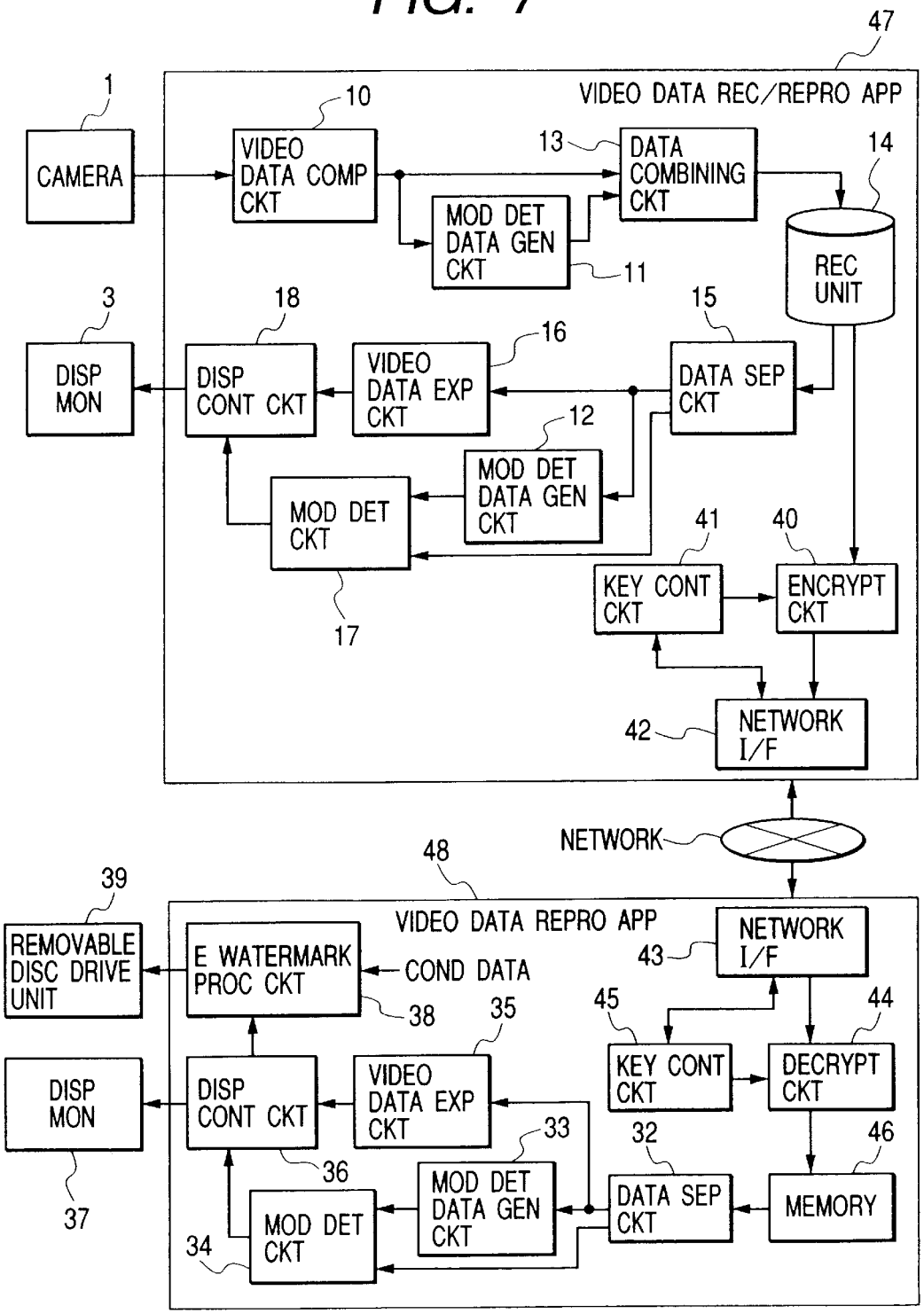
FIG. 7 is a block diagram of a video data recording and reproducing apparatus and a video data reproducing apparatus according to a fourth embodiment.

FIG. 7 is a block diagram of a video data recording and reproducing apparatus and a video reproducing apparatus according to a fourth embodiment. The structure of the video reproducing apparatus 47 according to the fourth embodiment is substantially the same as that according to the second embodiment. The difference is that the video recording and reproducing apparatus further includes an encrypting circuit 40, a key control circuit 43, and a network interface 42. Moreover, the video data reproducing apparatus 48 further includes a network interface 43, a decrypting circuit 44, a key control circuit 45, and a memory 46. On the other hand, the removable disc drive unit 31 is omitted.

To transmit the video data recorded in the recording unit 14 to the video data reproducing apparatus 48, the key control circuit 45 transmits a public key (B) to the video data recording and reproducing apparatus 47 through the network interface 43, a network 42, and the network 42. The key control circuit 41 receives the transmitted public key (B) and encrypts the command key (A) with the public key (B) and transmits the encrypted command key (A') to the video data reproducing apparatus 48. The key control circuit 45 receives the common key (A') and decrypts the common key (A') with a secret key (C) which corresponds to the public key (B) to obtain the common key (A). Then, exchanging of keys has finished. However, there is another method of exchanging keys. That is, the key control circuit 41 in the video data recording and reproducing apparatus 47 and the key control circuit 45 in the video data reproducing apparatus 48 have the same key control tables and number data are exchanged to obtain the corresponding keys.

Next, the encrypting circuit 40 encrypts the video data and the additional data, that is, the combined data, with the common key (A). The encrypted data is transmitted to the video data reproducing apparatus 48 though the network interface 42 and the network. The network may be a digital telephone network, the PSTN, the internet, the LAN or other various networks.

The network interface 43 receives the encrypted data and the decrypting circuit 44 decrypts the encrypted data with the common key A. The decrypted data is stored in the memory 46. The data separating circuit 32 separates the data read from the memory into the compressed video data and the first modification detection data. The compressed video data is supplied to the video data expansion circuit (program) 35 and to a second modification detection data generation circuit (program) 33. The video data expansion circuit 35 expands the compressed video data. The modification detection data generation circuit 33 generates second modification detection data from the compressed video data from the data separating circuit 32 in the same manner as the first modification detection data generation circuit 11. The modification detection circuit 34 detects modification in the compressed video data. That is, the modification detection circuit 34 (program) compares the first modification data with the second modification data. The display control circuit (program) 36 controls outputting the expanded video data from the video data expansion circuit 35 in accordance with the result of comparing in the modification detection circuit 34. That is, when the first modification data agrees with the second modification data, the display control circuit 36 permits to supply the video data to the display monitor 37 and inhibits to supply the video data to the display monitor 37.

The display monitor 37 reproduces the expanded video data to provide reproduced video images to a user when outputting the video data is permitted.

The video data is reproduced (played back) in the same manner as the second embodiment if there is no data modification. In addition, if the video data is outputted as still image data, the electronic watermark processing circuit 38 embeds watermark data in the video data and a removable disc drive unit 39 records the video data with the watermark data on a removable recording medium. The watermark data is generated from condition data such as present date and time data, identification data such as image shooting apparatus, an image shooting person.

If the video data is modified, a portion of the watermark is destroyed, so that it is possible to detect the presence of modification with a program for detecting the destroying. Moreover, the information of the original video data is also recorded with the video data over a plurality of generations, so that recording condition such as the date and time and can be recorded in a copy of any generation.

As mentioned above, the video data recording and reproducing apparatus according to the fourth embodiment transmits video data and additional data with encrypting. This prevents a third party from stealing or unauthorized watching the video data.

Fifth Embodiment

Figure 8:
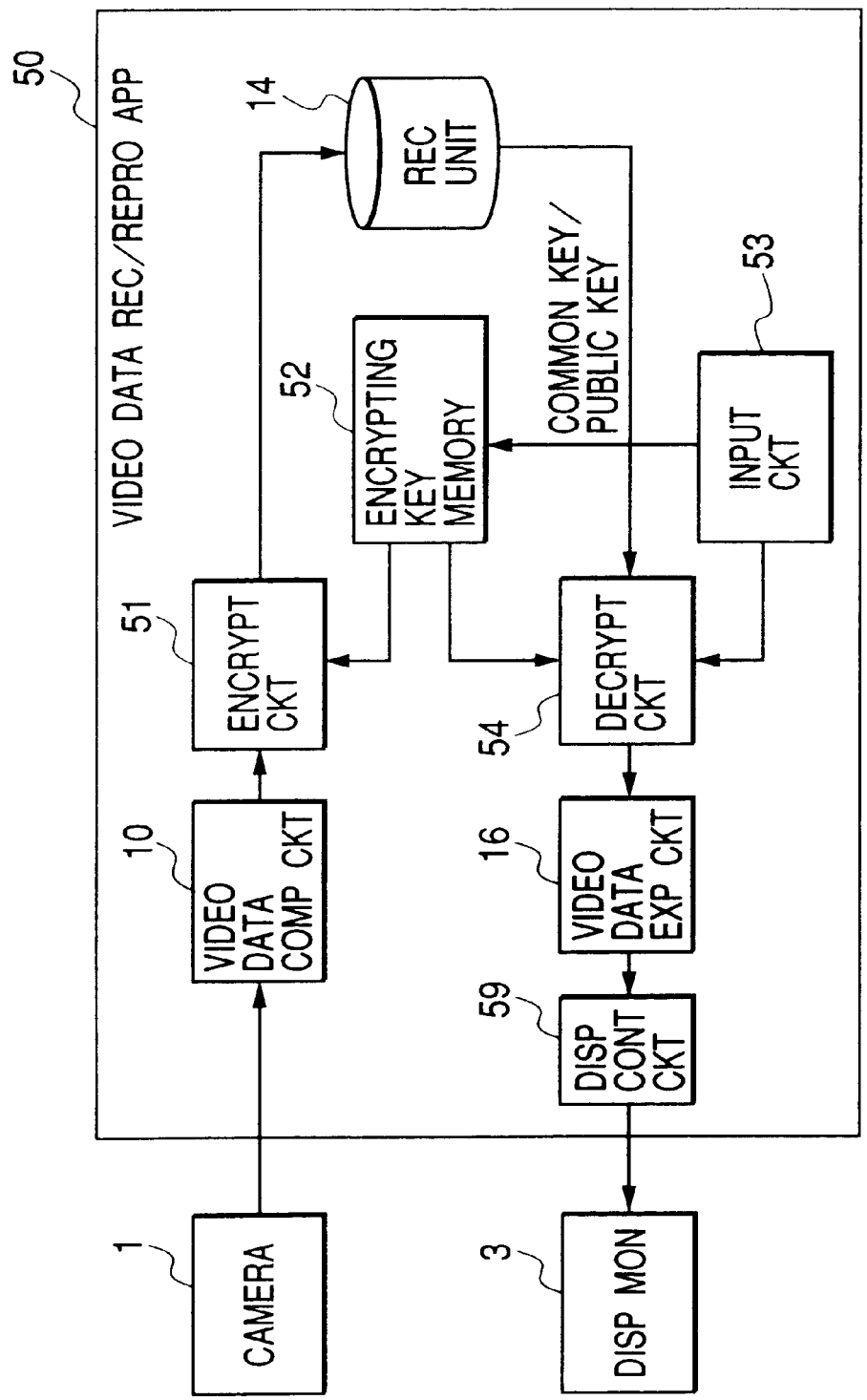
FIG. 8 is a block diagram of a video data recording and reproducing apparatus and a video data reproducing apparatus according to a fifth embodiment.

FIG. 8 is a block diagram of a video data recording and reproducing apparatus and a video reproducing apparatus according to a fifth embodiment.

The video signal from a camera 1 is supplied to a video recording and reproducing apparatus 50.

A recording side of the video recording and reproducing apparatus 50 includes a video data compression circuit 10 for a/d-converting the video signal into video data and compressing the video data, an encrypting circuit 51, an encrypting key memory 52, and a recording unit 14 for recording the combined data on a recording medium.

A reproducing side of the video recording and reproducing apparatus 2 includes a portion of the recording circuit 14 for reading the combined data on the recording medium, a decrypting circuit 54, an input circuit 53, a portion of the encrypting key memory 52, a video data expansion circuit 16, and a display control circuit 59 for controlling outputting the expanded video data from the video data expansion circuit 16 in accordance with the decrypted data condition.

The output of the display control circuit 59 is supplied to the display monitor 3 which reproduces the expanded video data to display the reproduced video image.

An operator operates the input circuit 53 to input an encrypting key (A). The encrypting key memory 52 stores the inputted encrypting key (A). The video data compression circuit 10 a/d-converts the video signal from the camera 1 into video data and compresses the video data to reduce the amount of data. The encrypting circuit 51 encrypts the compressed video data with the encrypting key (A). In this processing, it is better to use common key system to reduce the processing interval because the a mount of data is large. However, it is also possible to use a public key. Moreover, the method of encrypting video data includes data scrambling in accordance with a predetermined rule or data processing method in which arithmetical operation is effected to the video data. That is, the encrypting includes methods of processing the compressed video data to disable to use the processed video data without a restoring process. Moreover, encrypting should be effected at a unit of frame because this makes it possible to decrypt only data in the necessary frames.

FIG. 9A is an illustration of the fifth embodiment showing data in the encrypting key memory and FIG. 9B is an illustration of the fifth embodiment showing data recorded in the recording unit 14.

The encrypted data (1) is recorded in the recording unit 14 and the key (A) is recorded in the encrypting key memory 52 with relation therebetween. More specifically, file identification data (address data, sector data, etc.) of the file (1) is stored in the encrypting key memory 52 together with the data of key (A). Similarly, the encrypted data (2) is recorded in the recording unit 14 and the key (B) is recorded in the encrypting key memory 52 with relation therebetween. It is desired that the encrypting key memory comprises a non-volatile memory an EEPROM, because the data should not be erased. Moreover, the key data is recorded outside the recording unit 14 to disable to reproduce the key data if the recording unit 14 is removed.

In reproducing, the operation input a key (D) with the input circuit 53. The decrypting circuit 54 reads the encrypted video data from the recording unit 14 and decrypts the video data with the key (D) corresponding to the key (A). The decrypted video data is expanded by the video data expansion circuit 16. The expanded video data is supplied to a display control circuit 59. The display control circuit 59 checks data at a predetermined position in a frame. If the decrypting is correctly effected, that is, the inputted key (D) corresponds the key (A) used in encrypting, the data has a predetermined value or a pattern at a predetermined timing or a predetermined position in the frame. If the video data is correctly decrypted, the display control circuit 59 supplies the video data from the video data expansion circuit 16 to the display monitor 3. If the video data is incorrectly decrypted, the display control circuit 59 does not supply the video data from the video data expansion circuit 16 to the display monitor 3. However, the display control circuit 59 can be omitted because if the video data is incorrectly decrypted, the reproduced image on the display monitor is disturbed.

On the other hand, in order to reproduce the video data without the inputted key (D), the video data can reproduce with the key (A). That is, if the encrypting key memory can be referred from the input circuit 53, the file is decrypted with the key (A). Moreover, it is also possible that if the operator commands to reproduce the file (1), the encrypting memory automatically supplies the key (A) to the decrypting circuit 54.

Sixth Embodiment

Figure 10A:
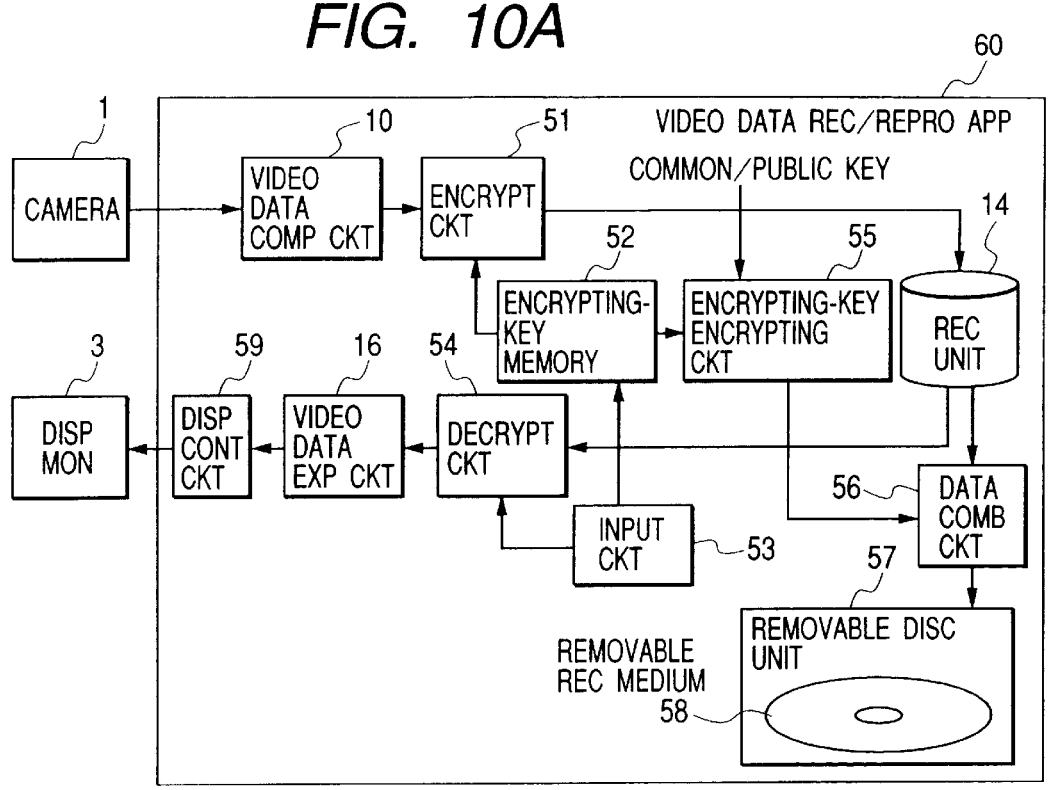
FIG. 10A is a block diagram of a video data recording and reproducing apparatus according to a sixth embodiment.
Figure 10B:
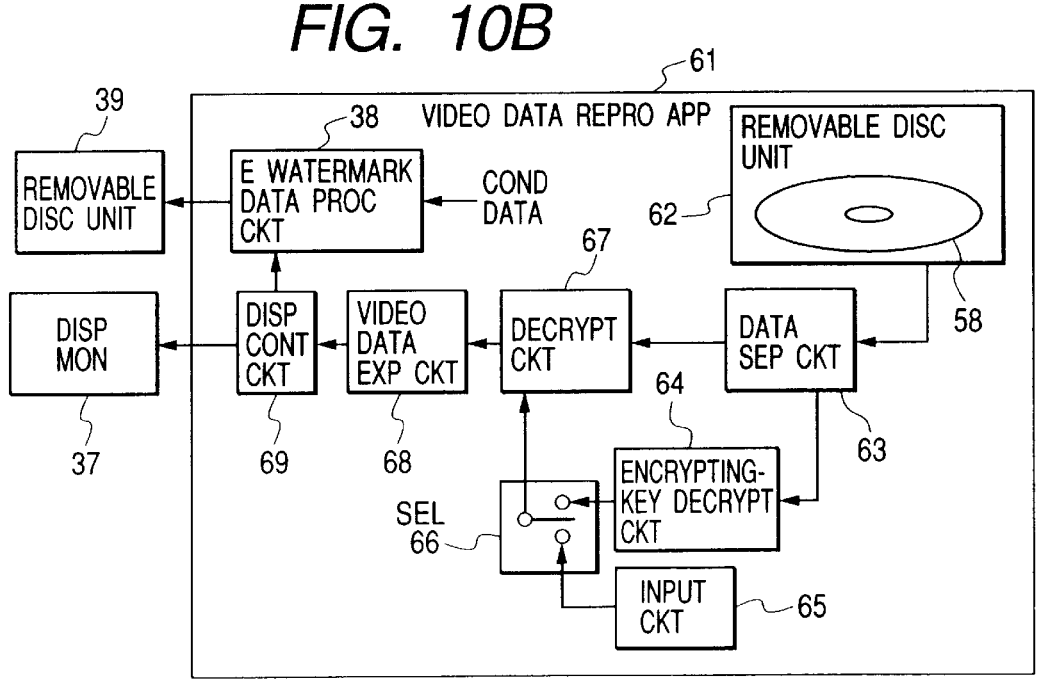
FIG. 10B is a block diagram of a video data reproducing apparatus according to the sixth embodiment.

FIG. 10A is a block diagram of a video data recording and reproducing apparatus according to a sixth embodiment. FIG. 10B is a block diagram of a video data reproducing apparatus according to the sixth embodiment. The structure of the video data recording and reproducing apparatus 60 according to the sixth embodiment is substantially the same as that according to the fifth embodiment. The difference is that an encrypting key encrypting circuit 55, a data combining circuit 56, and a removable disc unit 57 are further provided. The structure of the video data reproducing apparatus 61 has substantially the same structure as the reproducing side of the video data recording and reproducing apparatus 60. The difference is that a removable disc unit 62, a data separating circuit 63, an encrypting-key decrypting circuit 64, a selector 66, and an electronic watermark data processing circuit 38 are further provided.

FIG. 11 is an illustration of the sixth embodiment showing the data storing condition.

An operator operates the input circuit 53 to input an encrypting key (A) and input a file (1) of video data to store the encrypted video data in the recording unit 14. The encrypting key used for the file (1) is correspondingly stored in the encrypting key memory 52. This operation is repeated, encrypting-keys A to C are stored in the encrypting-key memory 52 and files (1) to (3) are correspondingly stored in the recording unit 14.

When video data in a file, for example, the file (2) is recorded on the removal recording medium 58, the video data is read from the recording unit 14 and the key B is encrypted by the encrypting-key encrypting circuit 55 to generate a key B'. The data combining circuit 56 combines the video data of file (2) with the key B' and the removal disc unit 57 records the video data of file (2) and the key B' as shown in FIG. 11.

The recorded removable recording medium 58 is set on the removable disc unit 62. The removable disc unit 62 reads the video data and the key B'. The data separating circuit 63 separates the read data into the video data of file (2) and the key B'. The video data of file (2) is supplied to the decrypting circuit 67. The key B' is supplied to the encrypting-key decrypting circuit 64. The encrypting-key decrypting circuit 64 decrypts the key B' to output key B.

When the selector 66 selects an output of the input circuit 65, an operator inputs a key. If the inputted key corresponds to the key B, the decrypting circuit 67 correctly decrypts the video data. If the inputted key does not correspond to the key B, the decrypting circuit 67 incorrectly decrypts the video data. The output of the decrypting circuit 67 is supplied to the video data expansion circuit 68 to expand the video data. The expanded video data is supplied to the display control circuit 69.

If the video data is correctly decrypted, the display control circuit 69 supplies the video data from the video data expansion circuit 68 to the display monitor 37. If the video data is incorrectly decrypted, the display control circuit 69 does not supply the video data from the video data expansion circuit 68 to the display monitor 37. However, the display control circuit 69 can be omitted because if the video data is incorrectly decrypted, the reproduced image on the display monitor is disturbed.

When the selector 66 is set to select the output of the encrypting-key decrypting circuit 64. The decrypted key B is supplied to the decrypting circuit 67 by the selector 66, so that the video data of file (2) is automatically reproduced.

If the video data is outputted as still image data with another removable disc unit 39, the electronic watermark processing circuit 38 embeds watermark data in the video data and a removable disc drive unit 39 records the video data with the watermark data on a removable recording medium.

Seventh Embodiment

Figure 12:
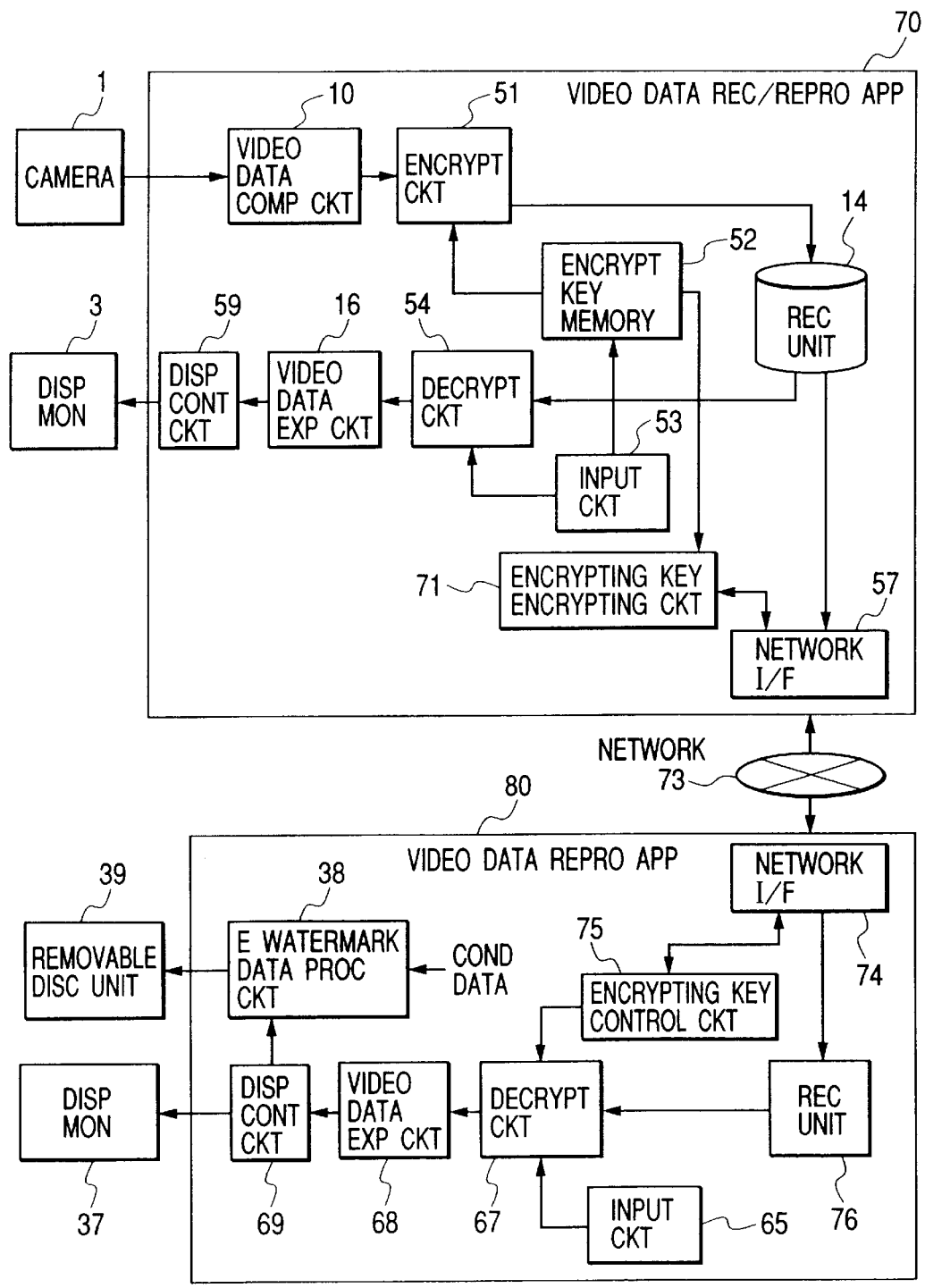
FIG. 12 is a block diagram of a video data recording and reproducing apparatus and a video data reproducing apparatus according to a seventh embodiment.
Figure 13:
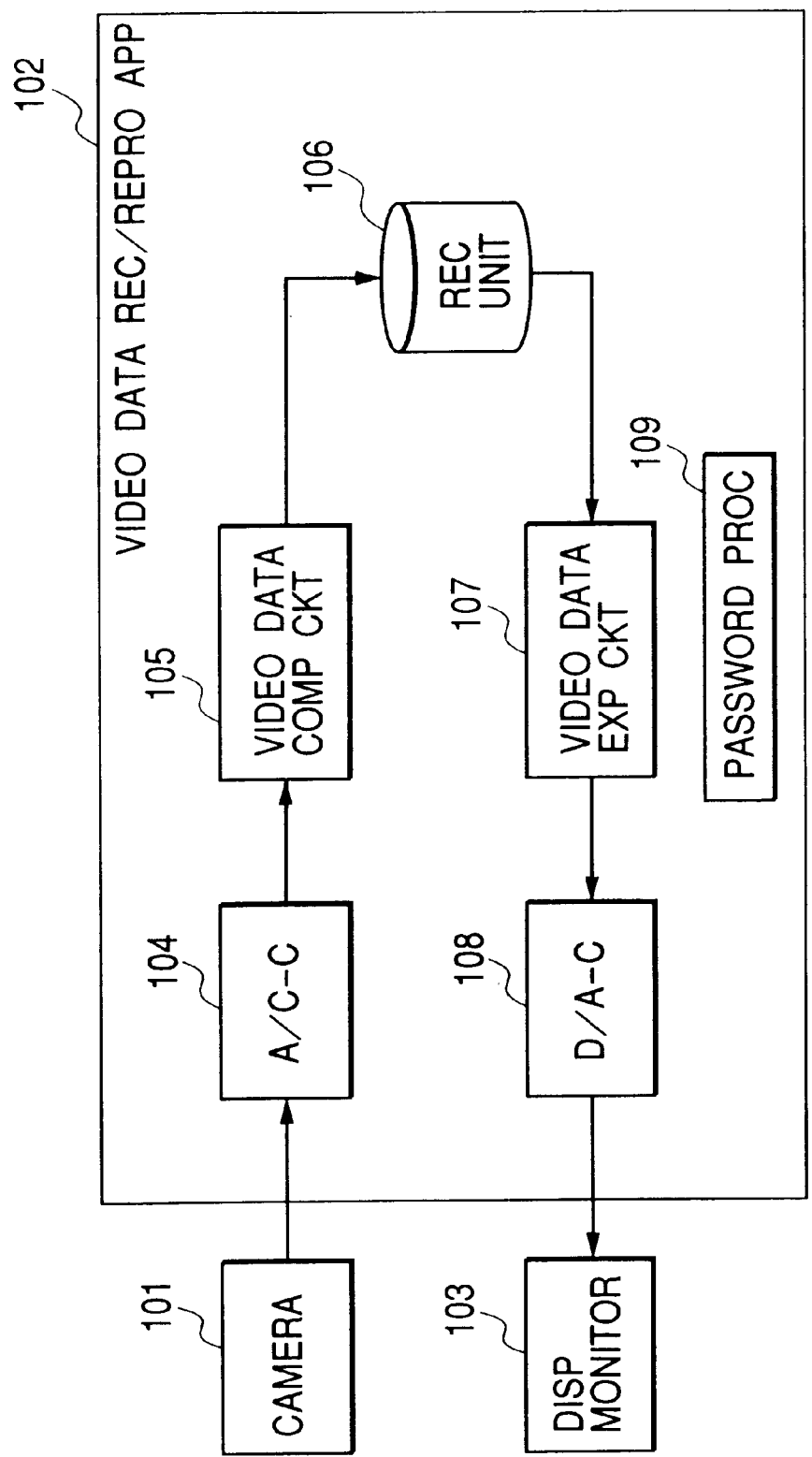
FIG. 13 is a block diagram of a prior art video data recording and reproducing apparatus.

FIG. 12 is a block diagram of a video data recording and reproducing apparatus and a video data reproducing apparatus according to a seventh embodiment. The structure of the video data recording and reproducing apparatus 70 according to the seventh embodiment is substantially the same as that according to the sixth embodiment. The difference is that an encrypting-key encrypting circuit 71 and a network interface 72 are further provided. On the other hand, a data combining circuit 56 and the removable disc unit 57 are omitted. The structure of the video data reproducing apparatus 80 according to the seventh embodiment is substantially the same as that according to the sixth embodiment. The difference is that an encrypting-key control circuit 75, a network interface 74, and a recording circuit 76 are further provided. On the other hand, a data separating circuit 63, the removable disc unit 58, and the selector 66 are omitted. The video data and the key are stored in the recording unit 14 and the encrypting-key memory 52 as the same manner as the sixth embodiment.

If the video data is transmitted to the video data reproducing apparatus 80, it should be prevented that the video data is stolen and the video data is watched in an unauthorized manner. The video data has been encrypted, so that security is provided. On the other hand, transmitting key should be protected during transmission.

The encrypting-key control circuit 75 transmits a public key (E) to the encrypting-key encrypting circuit 71 through the network interface 74, the network 73, and the network interface 72. Further, if a reproduction demand of a file is transmitted to the video data reproducing apparatus 80 to the video data recording and reproducing apparatus 70, the encrypting-key encrypting circuit 71 encrypts the encrypting key (F) of the file with the public key (E) to output a key (F'). The network interface 72 transmits the key (F') to the encrypting-key control circuit 75. The encrypting key control circuit 75 decrypts the key (F') to obtain the key (F). On the other hand, the video data of the specified file is transmitted to the recording circuit 76 as it is through the network 73.

An operator inputs a key (G) for the file. If the inputted key (G) corresponds to the key (F), the video data is correctly decrypted by the decrypting circuit 67. If the inputted key (G) does not correspond to the key (F), the video data is incorrectly decrypted by the decrypting circuit 67. The video data is expanded and displayed on the display monitor as the same manner as the sixth embodiment.

On the other hand, if it is permitted that inputting with keys by the operator is omitted, the encrypting key control circuit 75 supplied the key (F) to the decrypting circuit 67 to reproduce the video data of the file.

If the video data is outputted as still image data with another removable disc unit 39, the electronic watermark processing circuit 38 embeds watermark data in the video data and a removable disc drive unit 39 records the video data with the watermark data on a removable recording medium.

As mentioned above, according to the seventh embodiment, when the video data recording and reproducing apparatus 70 transmits the recorded encrypted video data through the network 73, the encrypting key encrypting circuit 71 encrypts the encrypting key and transmits encrypted key to the video data reproducing apparatus 80. The received encrypted video data is recorded in the recording unit 76 as it is. The encrypting key control circuit 75 controls the encrypting key. When reproducing of a desired file of video data is commanded, the encrypting key control circuit 75 decrypts the encrypted key for the requested file and reads only the desired file and decrypts the video data. Thus, illegal reproduction is prevented.

What is claimed is:

1. A video data recording and reproducing apparatus comprising:

data compression means for compressing video data;

first modification detection data generation means for generating first modification detection data in accordance with said compressed video data;

combining means for combining said video data with said first modification detection data to output combined data;

recording means for recording said combined data on a recording medium;

reading means for reading said combined data from said recording medium;

separating means for separating said combined data from said reading means into said compressed video data and said first modification detection data;

second modification detection data generation means for generating second modification detection data in accordance with said compressed data from said separating means;

comparing means for comparing said data modification detection data from said separating means with said second data modification detection data;

data expansion means for expanding said compressed video data from said separating means to output expanded video data; and outputting control means for controlling outputting said expanded video data in accordance with said result of said comparing means.

2. A video data recording and reproducing apparatus as claimed in claim 1, wherein said first modification detection means comprises error check code generating means for generating said first modification detection data from at least a portion of said video data and said first modification detection means comprises error check code generating means for generating said first modification detection data from at least a portion of said video data, said first modification detection data being represented with one selected from a group consisting of check sum codes, parity codes, and Cyclic Redundancy Check codes.

3. A video data recording and reproducing apparatus as claimed in claim 1, further comprising recording means for recording said combined data from said reading means on a removable recording medium.

4. A video data recording and reproducing apparatus as claimed in claim 1, further comprising:

network interface means for communicating with a network;

decrypting control data generation means for generating decrypting control data in accordance with an encrypting key; and encrypting means for encrypting said combined data with said encrypting key, said network interface means transmitting said encrypted combined data and said decrypting control data to said network.

5. A video data reproducing apparatus for reproducing combined data including compressed video data and first modification detection data on a removable recording medium, said video data being recorded with first modification detection data generated in accordance with said video data with correspondence with said video data, comprising:

reading means for reading said combined data from said removable recording medium;

separating means for separating said combined data from said reading means into said compressed video data and said first modification detection data;

modification detection data generation means for generating second modification detection data in accordance with said compressed data from said separating means;

comparing means for comparing said data modification detection data from said separating means with said second data modification detection data;

data expansion means for expanding said compressed video data from said separating means to output expanded video data; and outputting control means for controlling outputting said expanded video data in accordance with said result of said comparing means.

6. A video data reproducing apparatus as claimed in claim 5, wherein said reading means comprises a DVD-RAM drive and said removal recording medium comprises a DVD-RAM disc.

7. A video data reproducing apparatus as claimed in claim 5, wherein said modification detection data generation means includes a first software processing means for executing a first program to generate said second modification detection data, comparing means includes a second software processing means for executing a second program to compare said first modification detection data from said separating means with said second data modification detection data, and data expansion means includes a third software processing means for executing a third program to expand said compressed video data from said separating means.

8. A video data reproducing apparatus as claimed in claim 5, further comprising:

time data generation means for generating present time data;

condition detection means including storing means and input means for detecting a condition in accordance with condition data from said storing means and input data from said input means;

electronic watermark data adding means for generating watermark data from said present time data and said condition and adding the watermark data to said expanded video data to generate watermark data added video data; and recording means for recording said watermark data added vide data on another removable recording medium.

9. A method of detecting modification comprising the steps of:

generating first modification detection data in accordance with said compressed video data;

correspondingly recording said compressed video data and said modification detection data on a recording medium;

reading means for reading said compressed video data and said first modification detection data from said recording medium;

generating second data modification detection data in accordance with said read compressed data;

comparing said read first data modification detection data with said second data modification detection data; and controlling reproducing said compressed data in accordance with said comparing result.

10. A video data recording and reproducing apparatus comprising:

first modification detection data generation means for generating first modification detection data from video data;

recording means for correspondingly recording said video data and said first modification detection data on a recording medium;

reading means for reading said video data and said first modification detection data from said recording medium;

second modification detection data generation means for generating second modification detection data in accordance with said video data from said reading means;

comparing means for comparing said first data modification detection data from said reading means with said second data modification detection data; and outputting control means for controlling outputting said video data from said reading means in accordance with said result of said comparing means.

11. A video data recording and reproducing apparatus as claimed in claim 10, further comprising:

data compression means for compressing video data to supply compressed video data to said first modification detection data generation means and said recording means as said video data; and data expansion means for expanding said video data from said reading means to supply expanded video data to said outputting control means as said video data.

12. A video data reproducing apparatus comprising:

receiving means for receiving video data and first modification detection data generated in accordance with said video data;

modification detection data generation means for generating second modification detection data in accordance with said video data from said receiving means;

comparing means for comparing said first modification detection data from said receiving means with said second data modification detection data; and outputting control means for controlling outputting said video data in accordance with said result of said comparing means.

* * * * *